(12) United States Patent
Balabine

(10) Patent No.: US 11,283,821 B2
(45) Date of Patent: Mar. 22, 2022

(54) METHOD, APPARATUS, AND COMPUTER-READABLE MEDIUM FOR DETERMINING RISK ASSOCIATED WITH ANOMALOUS BEHAVIOR OF A USER ON A COMPUTER NETWORK

(71) Applicant: Informatica LLC, Redwood City, CA (US)

(72) Inventor: Igor Balabine, Menlo Park, CA (US)

(73) Assignee: INFORMATICA LLC, Redwood City, CA (US)

(*) Notice: Subject to any disclaimer, the term of this patent is extended or adjusted under 35 U.S.C. 154(b) by 578 days.

(21) Appl. No.: 15/703,426

(22) Filed: Sep. 13, 2017

(65) Prior Publication Data
US 2019/0081967 A1 Mar. 14, 2019

(51) Int. Cl.
*H04L 29/06* (2006.01)
*G06F 21/50* (2013.01)
*G06F 21/57* (2013.01)
*H04L 67/50* (2022.01)
*H04L 43/0876* (2022.01)

(52) U.S. Cl.
CPC .......... *H04L 63/1425* (2013.01); *G06F 21/50* (2013.01); *G06F 21/577* (2013.01); *H04L 63/1433* (2013.01); *H04L 67/22* (2013.01); *H04L 43/0876* (2013.01); *H04L 63/1441* (2013.01)

(58) Field of Classification Search
CPC .. H04L 63/1425; H04L 63/1433; G06F 21/50
USPC ............................................................ 726/23
See application file for complete search history.

(56) References Cited

U.S. PATENT DOCUMENTS 8,566,956 B2 * 10/2013 Slater ................... G06F 21/552
726/28

\* cited by examiner

*Primary Examiner* — William J. Goodchild
(74) *Attorney, Agent, or Firm* — Amardeep S. Grewal; Reed Smith LLP

(57) ABSTRACT

A system, method, and computer-readable medium for determining risk associated with anomalous behavior of a user on a computer network including receiving anomalous behavioral data corresponding to anomalous activity of the user on the computer network, determining surprisal values corresponding to one or more behavioral factors based on one or more of: one or more probabilities corresponding to one or more current values or one or more characteristics of the one or more behavioral factors, determining one or more dynamic weights corresponding to the one or more behavioral factors based at least in part on the one or more current values and historically expected values of the one or more behavioral factors for the user, and determining a risk metric corresponding to the anomalous activity of the user based on the surprisal values, the one or more dynamic weights, and static weights assigned to the one or more behavioral factors.

27 Claims, 14 Drawing Sheets

METHOD, APPARATUS, AND COMPUTER-READABLE MEDIUM FOR DETERMINING RISK ASSOCIATED WITH ANOMALOUS BEHAVIOR OF A USER ON A COMPUTER NETWORK

BACKGROUND

Data assets monitoring is a critical data management and information technology (IT) function often used by Enterprises and Cloud Services Providers, which involves watching the activities occurring on an internal network for problems related to performance, reliability, misbehaving hosts, suspicious user activity, etc.

Anomaly detection is the identification of items, events or behavior which differs from an expected, desired or normal pattern. When studied in the context of data consumers, anomalous behavior detection mechanisms must be capable of distinguishing unusual behavior patterns caused by regular operations such as data backup to a remote storage device and behavior patterns caused by the presence of malicious actors performing sensitive data hoarding, scanning, snooping, and legitimate user impersonation.

A 2014 study by Intel Security estimates global economy losses due to cybercrime between $375 and $575 Billion and indicates a significant growth trend in the cybercrime industry. Cybercrime affects private businesses, global corporations, individuals, government and military organizations. Sophos estimates that in 2013 more than 800 million individual data records were compromised.

In order to reduce or eliminate losses from cybercrime operations, anomalous activities triggered by malicious actors must be detected and reported to IT security personnel in a timely manner.

However, data user anomalous behavior detection becomes exceptionally difficult when the number of data users and data assets under observation increases, and the complexity of each observed item or event also increase. Detecting anomalous behavior of data users is an extreme example of a complex anomaly detection problem.

Traditionally, detection of anomalous events attributed to data users was in the domain of network security analysts. Typically, a security analyst possesses a collection of tools accumulated over the years while investigating security incidents. A large majority of those investigative tools are suitable for forensic investigations that take place after a security incident has been discovered. However, by the time of discovery cybercriminals may have already accomplished their objectives and retrieved valuable information from the victim's data assets.

Due to the volume of anomalous behavior data that is provided to network security analysts for an enterprise, the process of identifying anomalous behaviors that constitute an elevated risk versus anomalous behaviors that are benign or incidental is time consuming and inefficient. This delay allows threats to go unmitigated and prevents early detection of high-risk behaviors and suspicious users.

Accordingly, improvements are needed in systems for analysis of anomalous behavior that allow for identification of high-risk users and high-risk behavior.

DETAILED DESCRIPTION

While methods, apparatuses, and computer-readable media are described herein by way of examples and embodiments, those skilled in the art recognize that methods, apparatuses, and computer-readable media for determining risk associated with anomalous behavior of a user on a computer network are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

The Applicant has discovered a method, apparatus, and computer-readable medium that solve the problem of analyzing anomalous behavior of users in computer network and identifying anomalous behaviors and/or users that pose high levels of risk. The system disclosed herein quantifies perceived risk associated with anomalous events induced by actors in an enterprise environment. This quantified risk can then be used by the system to take remedial or preventative actions and alert security administrators. As discussed further in the following description, risk associated with certain anomalous behaviors or events can also be tracked over time to provide a risk profile of a user and flag certain users for increased scrutiny.

Figure 1:
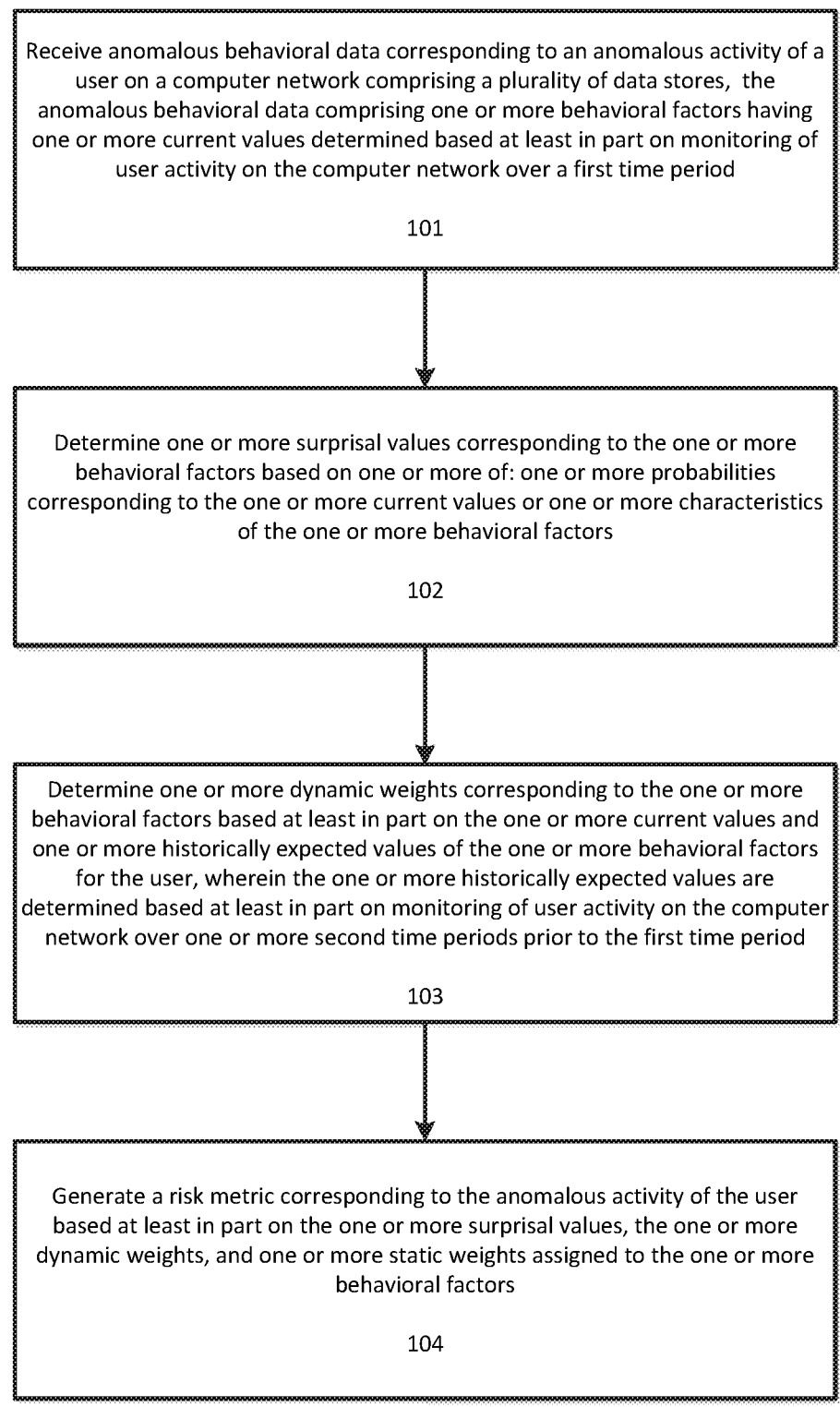
FIG. 1 illustrates a flowchart for determining risk associated with anomalous behavior of a user on a computer network according to an exemplary embodiment.

FIG. 1 illustrates a flowchart for determining risk associated with anomalous behavior of a user on a computer network according to an exemplary embodiment. At step 101 anomalous behavioral data corresponding to an anomalous activity of a user on a computer network comprising a plurality of data stores is received.

As used herein, a data store can refer to any computing device or electronic device connected to the network, such as a database, a server, a client computing device, a mobile device, a router, a modem, or any other component that forms part of the computer network.

The anomalous behavior can be activity that is performed by an automated action or program, such as an automatic script that performs a set of tasks. In the situation where the anomalous activity is an automated action, the automated action can be associated with a user based upon information regarding which user authorized, initiated, designed, or had permissions to access the automated action.

Anomalous behavior can include any actions or usage patterns that are inconsistent with previous actions or usage patterns of a user, unusual for a user, or unexpected for a particular user. Anomalies are a class of unusual or unexpected user activities that do not explicitly break any enterprise policies but that are inconsistent with past user activities. For example, if user John Doe typically accesses 200 sensitive data stores (on average) every month and in the month of February accesses 3,500 sensitive data stores, then that behavior can be flagged as anomalous.

The anomalous behavioral data includes one or more behavioral factors having one or more current values determined based at least in part on monitoring of user activity on the computer network over a first time period by one or more monitoring agents executing on one or more data stores in the plurality of data stores. For example, each data store in the plurality of data stores can have its own monitoring agent that tracks any user interactions with that data store (such as access requests, read/writes, access times, sensitive data records accessed, sensitive data types accessed, etc.).

Figure 2:
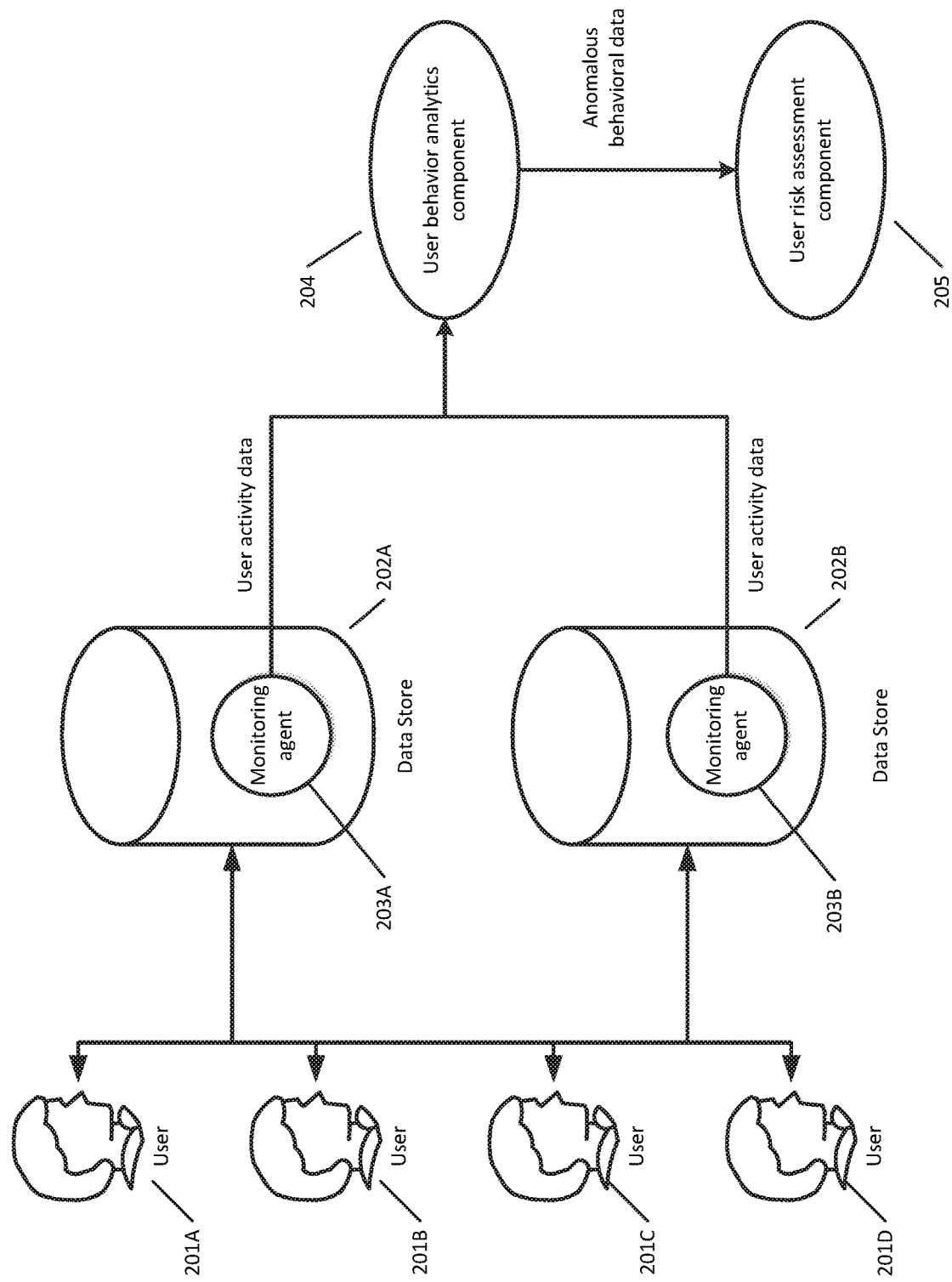
FIG. 2 illustrates an example architecture of a system for determining risk associated with anomalous behavior according to an exemplary embodiment.

FIG. 2 illustrates an example architecture of a system for determining risk associated with anomalous behavior according to an exemplary embodiment. Users 201A-201D are users of the computer network and access data stores 202A and 202B. The user activity and behavior data is tracked by monitoring agents 203A and 203B on data stores 202A and 202B, respectively. Of course, the number of data stores, users, and monitoring agents can vary. For example, a single monitoring agent connected to all data stores can perform monitoring of activity on all of the data stores. Alternatively, multiple monitoring agents can be used with each monitoring agent monitoring one or more data stores. Monitoring agent can also be located on a client-side user device. Many variations are possible and this example is not intended to be limiting.

The monitoring agent can be a process executing on a device, such as a data store, which is able to track interactions with one or more data stores, log user information and metadata corresponding to the interactions, and report the collected user behavior and activity data to another process or device that performs an analysis of the collected user behavior and activity data.

Monitoring agents 203A and 203B can provide the collected activity data to a user behavior analytics component 204. This user behavior analytics component 204 is shown separate from the data stores for clarity only, and it is understood that the user behavior analytics component 204 can itself be stored on a data store, at a centralized location or centralized device, at a client-side device, or anywhere else on the network.

User behavior analytics component 204 analyzes user activity and behavioral data corresponding to users 201A-201D of the computer network over a predetermined time period that can be set automatically or selected by a user and identifies aspects of the user activity and behavioral data that is anomalous with past user activity and behavioral data. For example, the time period can be an hour, a day, a week, a month, a year, or any other suitable period of time.

The user behavior analytics component 204 is a process, program, or hardware device that identifies one or more behavioral factors having one or more current values that are anomalous for a particular user and provides the one or more behavioral factors and the one or more current values of those behavioral factors to user risk assessment component 205. The user behavior analytics component 204 can also provide user activity data and behavioral information for non-anomalous activity to the user risk assessment component 205. This non-anomalous activity can be used as part of the risk assessment process, as discussed further below.

This user risk assessment component 205 is shown separate from the data stores and from the user behavior analytics component 204 for clarity only, and it is understood that the user risk assessment component 205 can itself be stored on a data store, at a centralized location or centralized device, at a client-side device, or anywhere else on the network. For example, the user behavior analytics component 204 and the user risk assessment component 205 can be located on the same device or be different modules within a single program.

This user risk assessment component 205 is a process, program, or hardware device that analyzes received behavioral factors and the current values of behavioral factors corresponding to anomalous activities of one or more users and generates risk metrics corresponding to the anomalous activities. As discussed in greater detail in this application, the user risk assessment component 205 can also generate user attention metrics that quantify which users should be flagged for heightened scrutiny or security actions based upon the user's history of anomalous activities.

Figure 3:
FIG. 3 illustrates a table showing behavioral factors that are tracked for users of the computer network and that can be included in the received anomalous behavioral data according to an exemplary embodiment.

FIG. 3 illustrates a table 300 showing behavioral factors 302 that are tracked for users of the computer network and that can be included in the received anomalous behavioral data according to an exemplary embodiment. These behavioral factors are subject to deviation, in which case they would be included in the received anomalous behavioral data. These factors are described in greater detail below.

Access time of day—one or more times of day that a user performed any kind of access to a component of the computer network. This can include, for example, access to a data store, data type, sensitive data type, record, sensitive record, or a time of day that a user submitted a request to access any of the above-mentioned components.

Access day of week—a day of the week that a user performed any kind of access to a component of the computer network. This can include, for example, access to a data store, data type, sensitive data type, record, sensitive record, or a day of the week that a user submitted a request to access any of the above-mentioned components.

Relocation—accesses by the user to one or more components of the computer network from multiple different locations, such different physical locations or different IP addresses. This can include a count of locations as well as information regarding the specific locations from which a component of the computer network was accessed or information regarding speed of relocation.

Count of data stores accessed—the data stores accessed by the user and a count of accesses to the data stores by the user. This can include not only which data stores the user accessed, but also a number of times the user accessed each unique data store.

Count of data requests—a count of data requests by the user. This can include not only which data the user requested, but also a number of times the user requested each unique item of data.

Count of records accessed—the records accessed by the user and a count of accesses to the records by the user. This can include not only which records the user accessed, but also a number of times the user accessed each unique record.

Count of sensitive records accessed—the sensitive records accessed by the user and a count of accesses to the sensitive records by the user. This can include not only which sensitive records the user accessed, but also a number of times the user accessed each unique sensitive record.

Count of data types accessed—the data types accessed by the user and a count of accesses to the data types by the user. This can include not only which data types the user accessed, but also a number of times the user accessed each unique data type.

Count of sensitive data types accessed—the sensitive data types accessed by the user and a count of accesses to the sensitive data types by the user. This can include not only which sensitive data types the user accessed, but also a number of times the user accessed each unique sensitive data type.

Cross group access—access by the user to one or more components of the computer network associated with different groups than the groups associated with the user.

Of course, the behavioral factors 302 shown in FIG. 3 are provided as examples only, and the behavioral factors can include any metric that tracks user actions on the computer network or components of the computer network, user engagement with the computer network or components of the computer network, or user activity or inactivity.

As shown in column 303, each of the behavioral factors 302 has a corresponding factor data type. The factor data types include a continuous data type that is described by a range of values. The factor data types also include an ordinal data type described by an enumerated sequence representing ordered gradation of each factor such as "atypical," "unusual," and "highly unusual."

If a behavioral factor described by a data type cannot be mapped to a gradation level, which is the case for nominal data types, then a secondary factor of the nominal event factor can be used for establishing a gradation level. For example, relocation of a tangible object such as a computer user can be characterized by the speed of the user's movement which becomes a continuous metric and which therefore enables characterization of the user relocation event.

Returning to FIG. 1, at step 102 one or more surprisal values corresponding to the one or more behavioral factors are determined based on one or more of: one or more probabilities corresponding to the one or more current values or one or more characteristics of the one or more behavioral factors. This step is explained in greater detail below and with respect to FIGS. 4-7.

Business data is a valued asset of a modern enterprise. While access to business data is typically restricted based on an actor's business role, in many cases actors have excessive access to information. This may happen due to organizational specifics or be a result of misconfiguration. Due to liberal access control policies, appearance of new data object types and/or new data stores in the actor's data requests may be a manifestation of the actor's anomalous behavior.

Informational value, also known as information entropy, of the data in a data store accessed by an actor can be represented by the surprisal measure. Surprisal gained in the process of data access is computed as:

$$I = -\Sigma_{i=1}^{n} \ln p_i$$

Where I corresponds to the total surprisal value of a particular behavioral factor, n corresponds to the total quantity of unique content elements associated with a behavioral factor, ln corresponds to the natural log, i corresponds to a unique content element in a plurality of unique content elements associated with the behavioral factor, and $p_i$ corresponds to the probability of an actor accessing the i-th unique content element. The term $\ln p_i$ indicates the "self-information" corresponding to a particular probability corresponding to a unique content element. The probability can be given by the following formula:

$$p_i = \frac{\text{the number of actor's accesses to element } i}{\text{total number of user accesses to element } i}$$

For example, when the behavioral factor is the "count of data stores accessed," then n can correspond to the total quantity of unique data stores accessed, i can correspond to a unique data store accessed, and $p_i$ can corresponds to the probability of an actor accessing the i-th unique data store. In this case, the probability can be given by:

$$p_i = \frac{\text{the number of actor's accesses to data store } i}{\text{total number of user accesses to data store } i}$$

In another example, when the behavioral factor is the "count of sensitive data types accessed," then n can correspond to the total quantity of unique sensitive data types accessed, i can correspond to a unique sensitive data type accessed, and $p_i$ can corresponds to the probability of an actor accessing the i-th unique sensitive data type. In this case, the probability can be given by:

$$p_i = \frac{\text{the number of actor's accesses to sensitive data type } i}{\text{total number of user accesses to sensitive data type } i}$$

Figure 4:
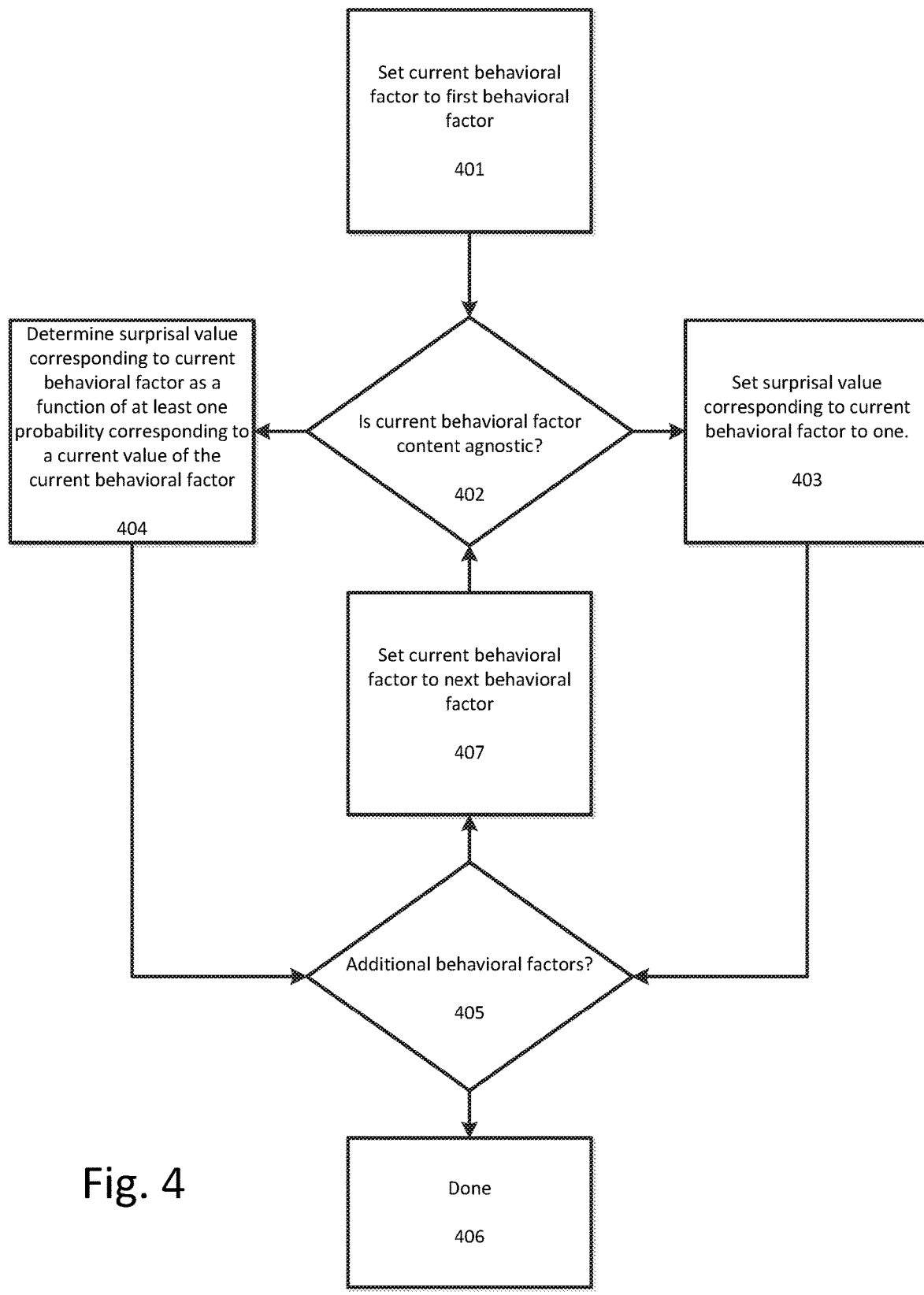
FIG. 4 illustrates a flowchart for determining surprisal values corresponding to multiple behavioral factors according to an exemplary embodiment.

When the anomalous behavioral data includes multiple behavioral factors, a surprisal value can be computed for each of the behavioral factors. FIG. 4 illustrates a flowchart for determining surprisal values corresponding to multiple behavioral factors according to an exemplary embodiment.

At step 401 the current behavioral factor is set to the first behavioral factor in a set of behavioral factors in the anomalous behavior data. The process can begin with the first behavioral factor and iterate through the remaining behavioral factors, as discussed in greater detail below.

At step 402 it is determined whether the current behavioral factor is content agnostic. A behavioral factor is content agnostic if the value of the behavioral factor is independent of the content or type of content accessed. Examples of content agnostic behavioral factors include the time of day, data of week, and relocation behavioral factors. Whether a behavioral factor is content agnostic can be indicated by a variable, such as a flag, associated with the behavioral factor. The data type of the behavioral factor can also be used to determine if the behavioral factor is content agnostic. For example, as shown in FIG. 3, all of the behavioral factors having a data type of ordinal are content agnostic.

If the current behavioral factor is content agnostic, then at step 403 the surprisal value corresponding to the current behavioral factor is set to "one." This indicates that there will be no net information gained from content agnostic behavioral factors.

If the current behavioral factor is not content agnostic, then at step 404 the surprisal value corresponding to the behavioral factor is determined as a function of at least one probability corresponding to a current value of the behavioral factor. This probability assessment is described above and explained further with respect to FIGS. 5-6.

At step 405 a determination is made regarding whether there are any additional behavioral factors in the set of behavioral factors in the anomalous behavior data. If there are additional behavioral factors, then at step 407 the current behavioral factor is set to the next behavioral factor in the set of behavioral factors and steps 402-405 are repeated. Otherwise, if there are no additional behavioral factors, then at step 406 the process of determining surprisal values ends.

When the behavioral factor is not content agnostic, the current value of the behavioral factor can indicate at least one unique content element. For example, when the behavioral factor is "Count of data stores accessed," the current values can indicate 2 unique data stores and their corresponding counts, such as:

(1) Data Store D1—12 accesses;
(2) Data Store F14—3 accesses;

The surprisal value for the behavioral factor in this situation can then be determined based upon probabilities associated with each of unique content elements accessed (Data Stores D1 and F14 in the above example).

Figure 5:
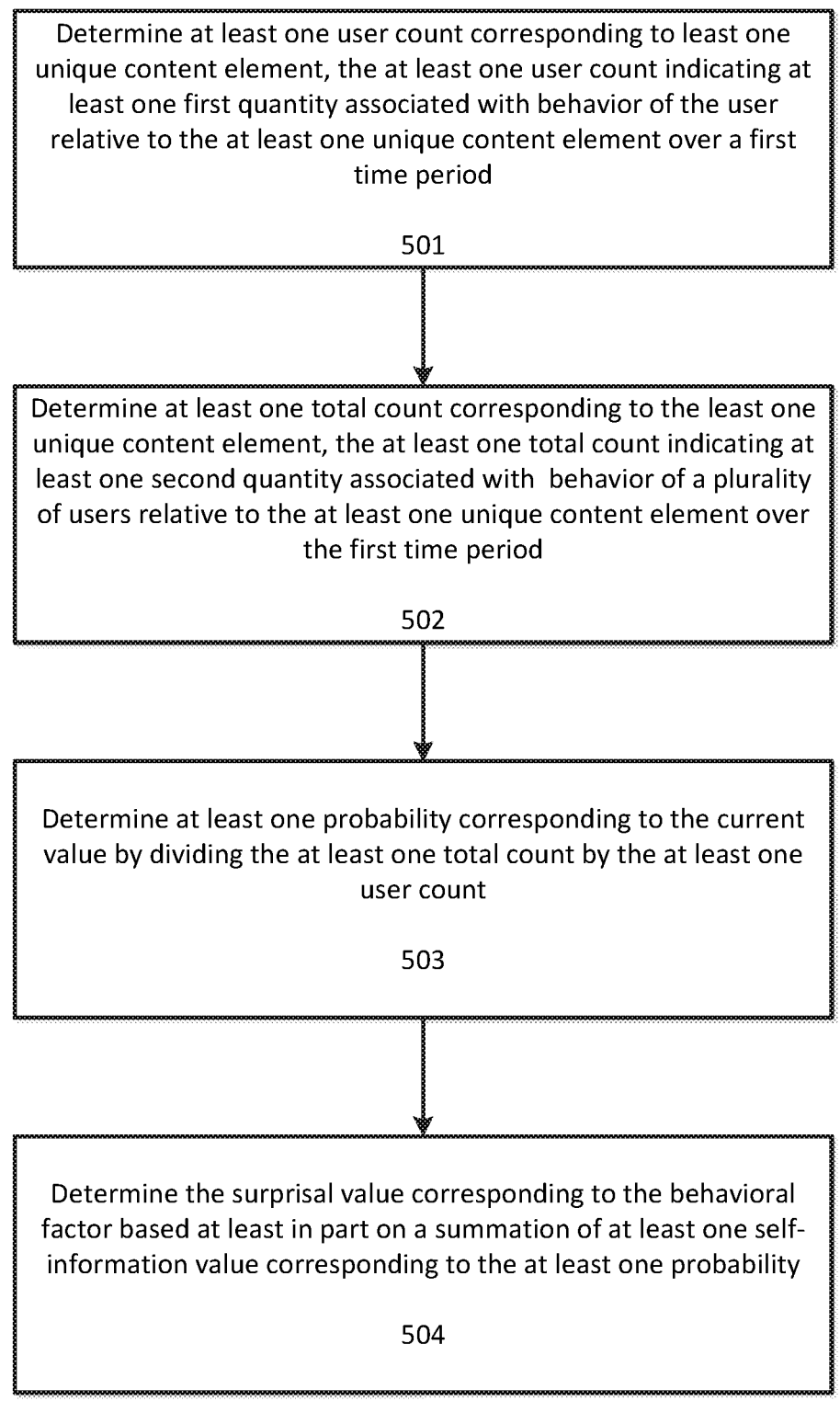
FIG. 5 illustrates a flowchart for determining a surprisal value corresponding to the behavioral factor based on at least one probability corresponding to a current value of the behavioral factor according to an exemplary embodiment.

FIG. 5 illustrates a flowchart for determining a surprisal value corresponding to the behavioral factor based on at least one probability corresponding to a current value of the behavioral factor according to an exemplary embodiment. The steps shown in FIG. 5 are performed for behavior factors that are not content agnostic and for which the current value of the behavioral factor indicates at least one unique content element.

At step 501 at least one user count corresponding to the least one unique content element is determined, wherein the at least one user count indicates at least one first quantity associated with behavior of the user relative to the at least one unique content element over a first time period. As discussed above, an example of this is the number of accesses by a user to a unique data store within a time period. If there is more than one unique content element (e.g., multiple unique data stores accessed), then a user count can be computed for each of the unique content elements.

At step 502 at least one total count corresponding to the least one unique content element is determined, wherein the at least one total count indicates at least one second quantity associated with behavior of a plurality of users relative to the at least one unique content element over the first time period. Using the above-mentioned example, the total count could indicate a total number of accesses by a plurality of users to the unique data store within the time period. If there is more than one unique content element (e.g., multiple unique data stores accessed), then a total count can be computed for each of the unique content elements. The total count information can be received, for example, from a user behavior analytics component 204 such as the one shown in FIG. 2.

At step 503 at least one probability corresponding to the current value is determined by dividing the at least one total count by the at least one user count. This is in accordance with the probability formula described with respect to step 102 of FIG. 1. If there is more than one unique content element (e.g., multiple unique data stores accessed), then a probability can be computed for each of the unique content elements.

At step 504 the total surprisal value corresponding to the behavioral factor is determined based on a summation of the self-information corresponding to the at least one probability. This step is reflected by the earlier described formula for total surprisal value:

$$I = -\Sigma_{i=1}^{n} \ln p_i$$

Where I corresponds to the total "surprisal" value of a particular behavioral factor, n corresponds to the total quantity of unique content elements associated with a behavioral factor, ln corresponds to the natural log, i corresponds to a unique content element in a plurality of unique content elements associated with the behavioral factor, $p_i$ corresponds to the probability of an actor accessing the i-th unique content element, and $\ln p_i$ corresponds to the self-information of a particular probability associated with a unique content element. In this case the self-information is computed as a natural log of the probability, but it is understood that other types of logarithms or bases may be used to assess self-information.

Figure 6:
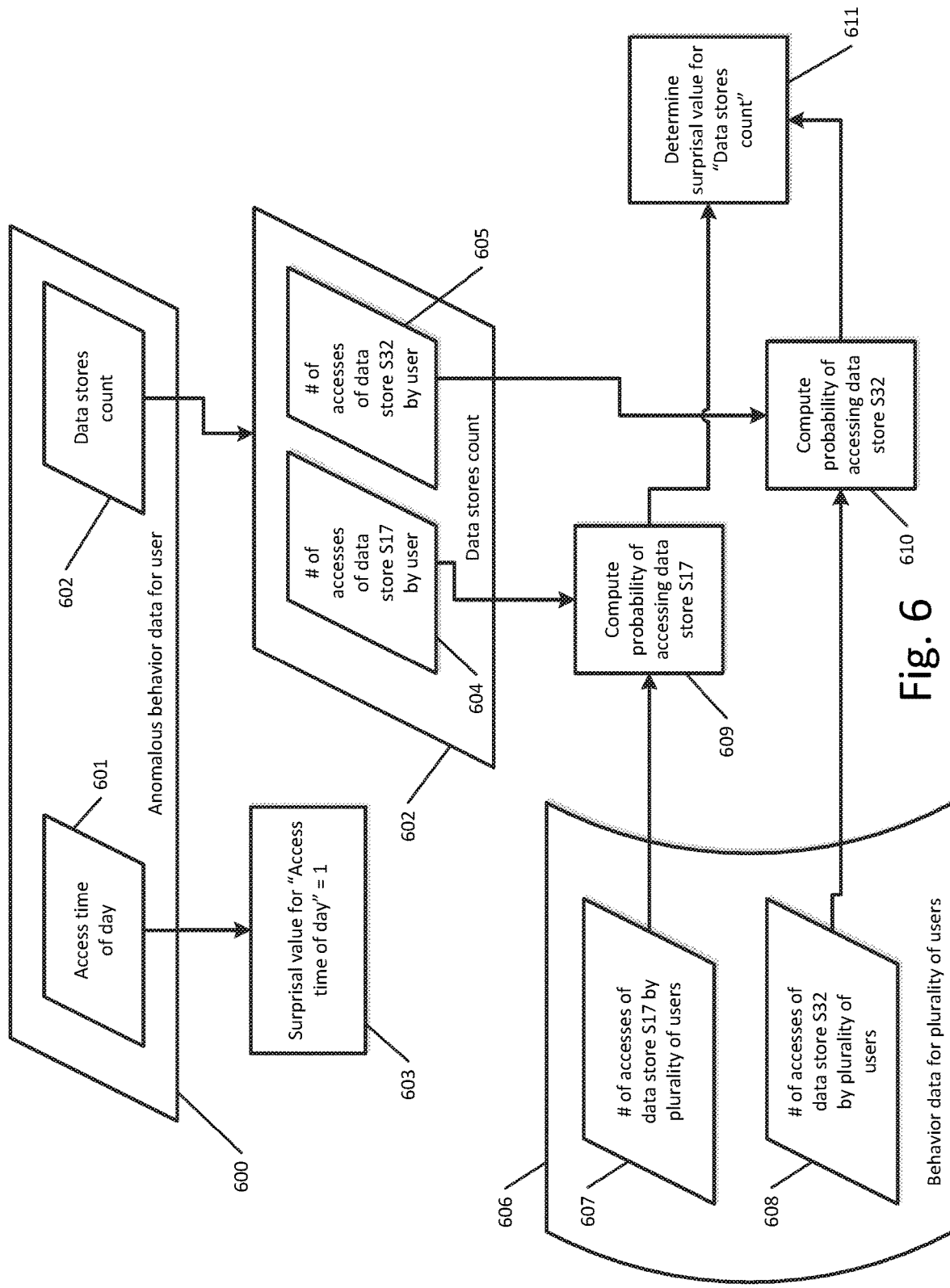
FIG. 6 illustrates an example of the surprisal value determination process according to an exemplary embodiment.

FIG. 6 illustrates an example of the surprisal value determination process according to an exemplary embodiment. Received anomalous behavior data 600 in FIG. 6 includes an access time of day 601 behavioral factor and a data stores count 602 behavioral factor. Since the access time of day 601 behavioral factor is content agnostic, the surprisal value for this behavioral factor is set to 1 at step 603.

As shown in FIG. 6, the data stores count 602 behavioral factor includes a first user count 604 of accesses of a first data store, data store S17, by a user, as well as a second user count 605 of accesses of a second data store, data store S32, by the user.

Behavior data for a plurality of users 606 is also received and used to determine the probabilities associated with each unique content element for behavioral factors that are not content agnostic. This behavior data can be received from monitoring agents, such as agents 203A and 203B shown in FIG. 2, and/or from an analytics component, such as component 204 shown in FIG. 2. The behavior data for the plurality of users 606 includes user data that is relevant to the anomalous behavior of the user. In this case, the behavior data 606 includes the number of accesses of data store S17 by the plurality of users 607 and the number of accesses of data store S32 by the plurality of users 608.

At step 609 the probability of accessing data store S17 is computed based on the number of accesses of data store S17 by the user 604 and the number of accesses of data store S17 by the plurality of users 607. Similarly, at step 610 the probability of accessing data store S32 is computed based on the number of accesses of data store S32 by the user 605 and the number of accesses of data store S32 by the plurality of users 608. Both of these probabilities are then used in step 611 to determine the surprisal value for the "data stores count" behavioral factor. The surprisal value can be determined in accordance with the above-mentioned equation.

Figure 7:
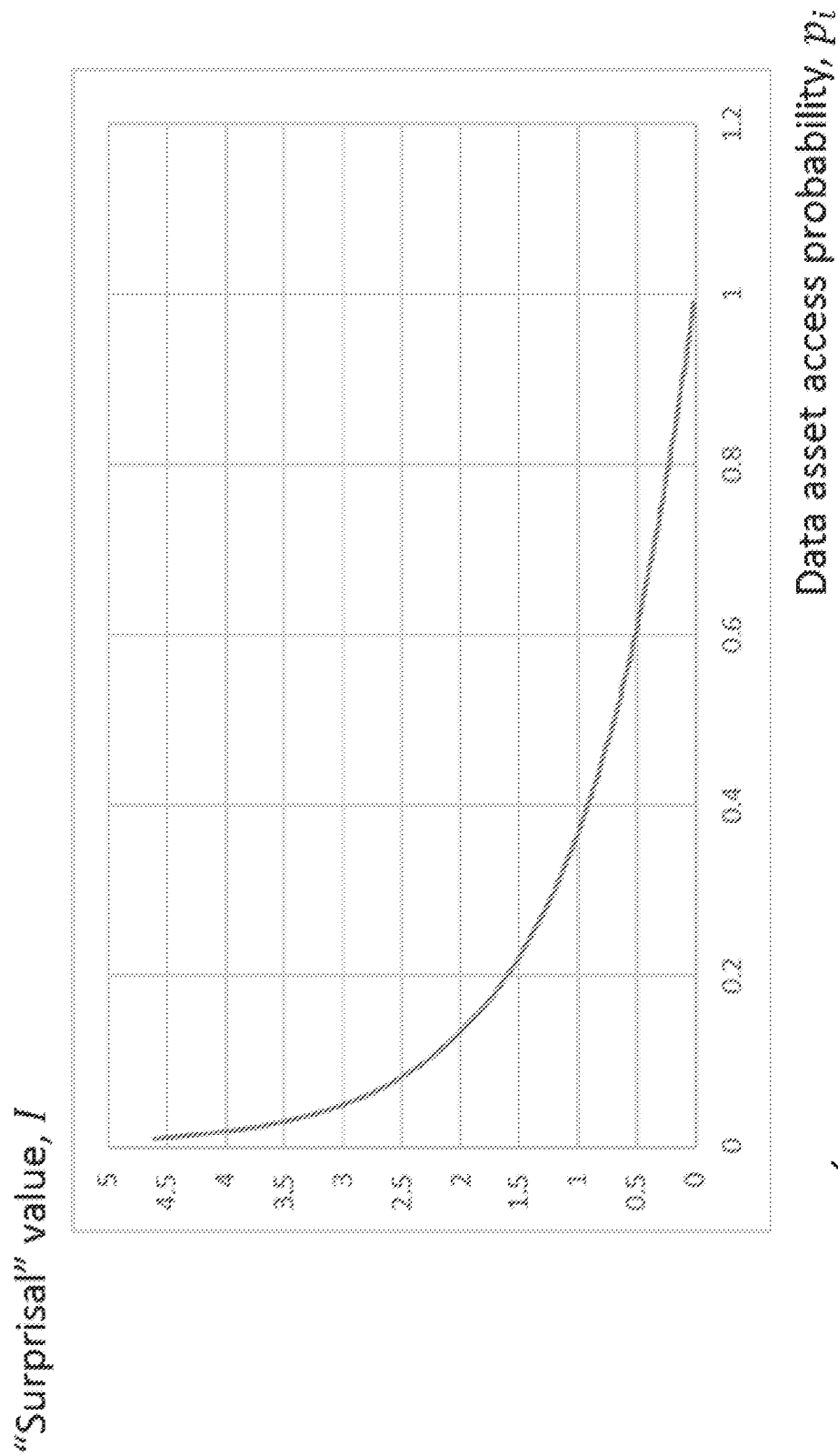
FIG. 7 illustrates a graph showing the relationship between the surprisal value and access probability according to an exemplary embodiment.

FIG. 7 illustrates a graph 700 showing the relationship between the surprisal value and access probability. As shown in the graph 700, the surprisal value has an inverse relationship with probability, with surprisal increasing as probability decreases.

Returning to FIG. 1, at step 103 one or more dynamic weights corresponding to the one or more behavioral factors are determined based at least in part on the one or more current values and one or more historically expected values of the one or more behavioral factors for the user. As explained below, the one or more historically expected values are determined based at least in part on monitoring of user activity on the computer network over one or more second time periods prior to the first time period by the one or more monitoring agents executing on the one or more data stores.

Dynamic weights are used to quantify the magnitude of an observed user's activities in comparison to previously observed activities of the user. In the case of continuous data types, the dynamic weight will be computed based on historically observed values of the behavioral factor. In the case of ordinal data types, the dynamic weight will be computer based on historically observed gradations.

Figure 8:
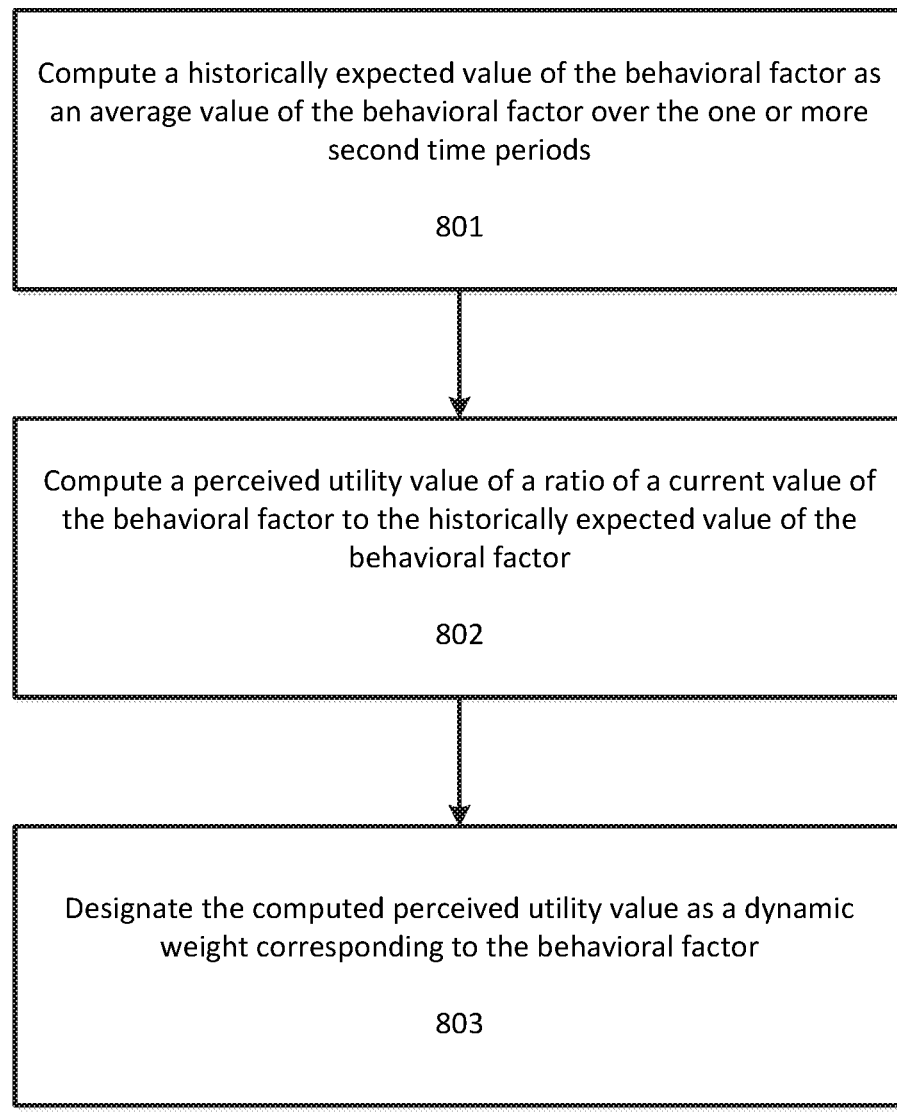
FIG. 8 illustrates a flowchart for determining a dynamic weight of a behavioral factor according to an exemplary embodiment.

FIG. 8 illustrates a flowchart for determining a dynamic weight of a behavioral factor according to an exemplary embodiment. At step 801 a historically expected value of the behavioral factor for the user is computed as an average value of the behavioral factor for the user over one or more previous time periods prior to the latest time period. For example, if the behavioral factor was count of sensitive data records accessed and in five preceding time periods, the user accessed 6, 7, 12, 3, and 4 sensitive data records, then the historically expected value of the behavioral factor for the user would be (6+7+12+3+4)/5=6.4 sensitive data records.

At step 802 a perceived utility value of a ratio of a current value of the behavioral factor to the historically expected value of the behavioral factor is computed. The perceived utility value can be computed as a logarithm, such as a natural log. Using the example of a behavioral factor of "count of sensitive data records accessed," if the current number of sensitive data records accessed by the user in the latest time period is 18 and the historically expected value of sensitive data records accessed is 6.4, then a perceived utility value can be calculated as a natural logarithm of the ratio 18/6.4.

At step 803 the computed perceived utility value is designated as a dynamic weight corresponding to the behavioral factor. The dynamic weight for a behavioral factor can then be given by the formula:

$$W_d = \ln\left(\frac{\text{Current Value of Behavioral Factor}}{\text{Historically Expected Value of Behavioral Factor}}\right)$$

Using the above example of the current number of sensitive data records accessed by the user in the latest time period being 18 and the historically expected value of sensitive data records accessed being 6.4, the dynamic weight of this behavioral factor would be ln (18/6.4)=1.03.

Dynamic weights are computed in accordance with the "expected utility" hypothesis which estimates the statistical expectation of valuations of the outcomes. The expected utility theory provides a foundation for the modern insurance applications based on a set of necessary and sufficient conditions under which the expected utility hypothesis holds (the von Neumann-Morgenstern utility theorem). The estimation of the expected ("perceived") value is based on the Bernoulli's utility function $u(v)=\ln v$, where $u(v)$—is a perceived value of an asset.

For continuous data types a ratio of the observed value and a historically expected value is considered as input into the utility function calculation. For the ordinal data types value estimation is based on an ordered list of the event severity gradation categories. For example, event severity gradations can be represented by the "atypical", "unusual" and "highly unusual" semantic categories each of which is assigned an increasing numeric value.

Selection of the numeric values for the ordinal data type's gradations ensures that both classes of events have an equal weight in the overall risk metric calculation. For example, the "highly unusual" semantic category can be assigned a numeric value of 3 and can correspond to 3 standard deviations observed in an event described by a continuous data type variable.

Returning to FIG. 1, at step 104 a risk metric corresponding to the anomalous activity of the user is generated based at least in part on the one or more surprisal values, the one or more dynamic weights, and one or more static weights assigned to the one or more behavioral factors.

Each behavioral factor can be assigned a static weight, $W_s$, which can be some value between 0 and a predetermined maximum static weight. The factors' static weights can be assigned, for example, by a system administrator or security analyst who is reviewing the anomalous behavior data. Static weights can also be determined automatically or algorithmically. Static weights can also be set to be the same value for all behavioral factor. In one example, the maximum static weight is 10 and static weights are assigned in the range from 0-10. Factors with a static weight set to 0 are excluded from the risk evaluation. Therefore, the static weight value can be used as a flag to deactivate certain inputs or categories of behavioral factors (by setting the static weight to zero).

Figure 9:
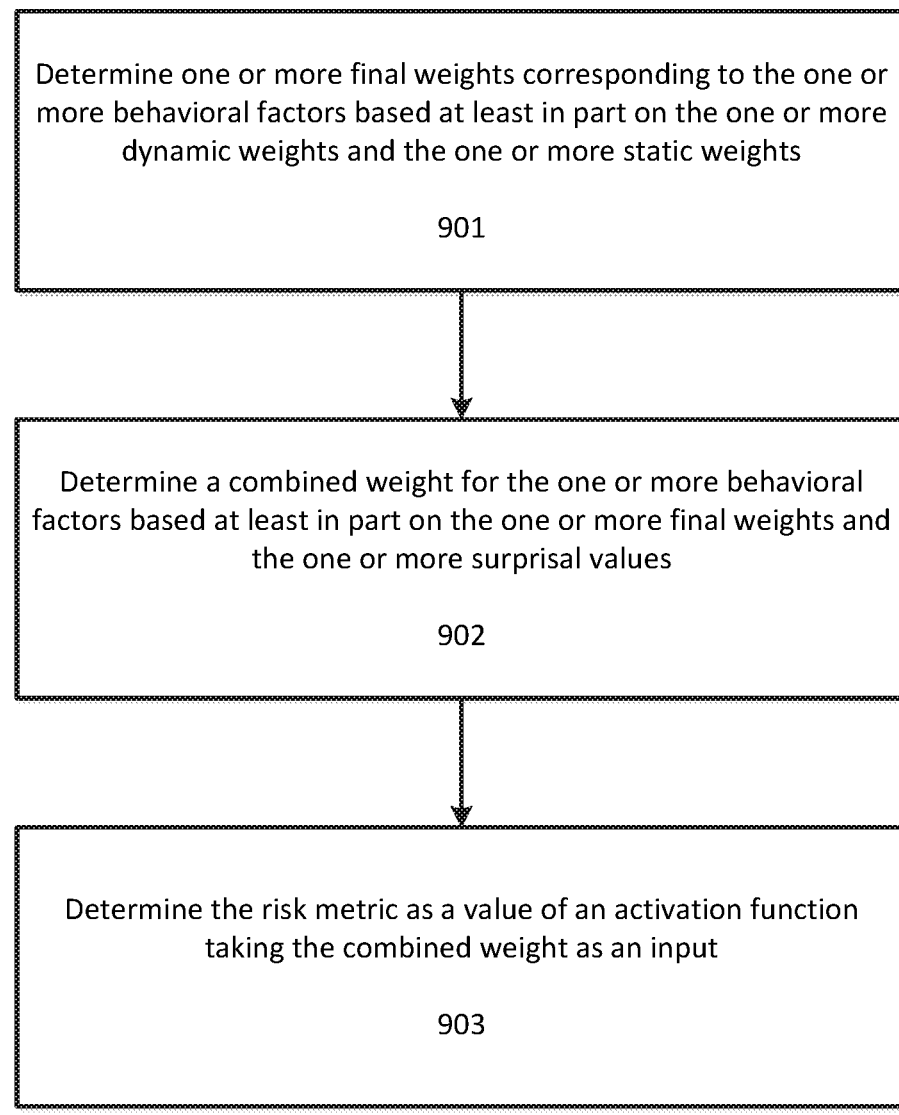
FIG. 9 illustrates a flowchart for generating a risk metric corresponding to the anomalous activity of the user based at least in part on one or more surprisal values, one or more dynamic weights, and one or more static weights assigned to one or more behavioral factors according to an exemplary embodiment.

FIG. 9 illustrates a flowchart for generating a risk metric corresponding to the anomalous activity of the user based at least in part on one or more surprisal values, one or more dynamic weights, and one or more static weights assigned to one or more behavioral factors according to an exemplary embodiment.

At step 901 one or more final weights corresponding to the one or more behavioral factors are determined based at least in part on the one or more dynamic weights and the one or more static weights. The final weight for each of the behavioral factors can be given by the equation:

$$W_f = W_s W_d$$

Where $W_f$ is the final weight of the behavioral factor, $W_s$ is the static weight of the of the behavioral factor, and $W_d$ is the dynamic weight of the of the behavioral factor. For example, if the static weight of a behavioral factor was 2 and the dynamic weight of that behavioral factor was 3, then the final weight of that behavioral factor would be 2×3=6.

At step 902 a combined weight is determined for the one or more behavioral factors based at least in part on the one or more final weights and the one or more surprisal values. The combined weight can be computed as an augmented mean of weights of deviant behavioral factors which comprise the anomalous activity and can be determined by the equation:

$$W_c = \ln(n+1) \Sigma_{i=1}^n (1+I_{f_i}) W_{f_i}/n$$

Where $W_c$ is the combined weight for the anomalous activity, n is the quantity of behavioral factors in the anomalous behavioral data corresponding to the anomalous activity, $I_{f_i}$ is the surprisal value for the i-th behavioral factor, and $W_{f_i}$ is the final weight of the i-th behavioral factor. As discussed earlier, $I_{f_i}$ will be equal to one for content agnostic behavioral factors, such as time of day and relocation. For non-content agnostic behavioral factors, the surprisal is given by the equation discussed earlier, in particular:

$$I_{f_i} = \Sigma_{j=1}^m \ln p_j$$

Where $I_{f_i}$ corresponds to the surprisal value of the i-th behavioral factor, m corresponds to the total quantity of unique content elements associated with a behavioral factor, ln corresponds to the natural log, j corresponds to a unique content element in a plurality of unique content elements associated with the behavioral factor, and $p_j$ corresponds to the probability of an actor accessing the j-th unique content element.

The anomalous activity is comprised of at least one deviant behavioral factor or a plurality of deviant behavioral factors. In the case where the anomalous activity comprises a a single deviant behavioral factor (n=1), the combined weight can given by a simplified version of the combined weight equation:

$$W_c = \ln(2)(1+I_f) W_f$$

Alternatively, the combined weight when the anomalous activity comprises a single deviant behavioral factor can be set equal to the final weight of the single behavioral factor.

At step 903 the risk metric for the anomalous activity is generated as a value of an activation function taking the combined weight as an input. An activation function of a node defines the output of that node given an input or set of inputs. In the context of neural networks, activation functions are utilized to trigger neuron "firing" when an input results in an output outside of a predetermined threshold. Activation functions can include, for example, an identity functions, binary step functions, bipolar step functions, binary sigmoid functions, bipolar sigmoid functions, ramp functions, etc.

The risk metric can also be referred to as an "event score," with the "event" referring to the anomalous activity by the user. The risk metric can be represented by a number between 0 and 1, with 1 corresponding to events/anomalous activities with the highest perceived utility value. For example, the event score/risk metric is generated as a value of the sigmoid function with selected preset scale and shift parameters:

$$s(w) = \frac{1}{1 + e^{-(aw+b)}}$$

Where s is the event score/risk metric, w is the combined weight (referred to above as $W_c$) of the anomalous activity by a user or an anomalous event, and a and b are pre-selected scale and shift parameters. Parameters a and b for behavioral anomalies and violations (which are discussed further below) can be different. The computed event score/risk metric can be further scaled to a desired range such as [0, 100].

Figure 10:
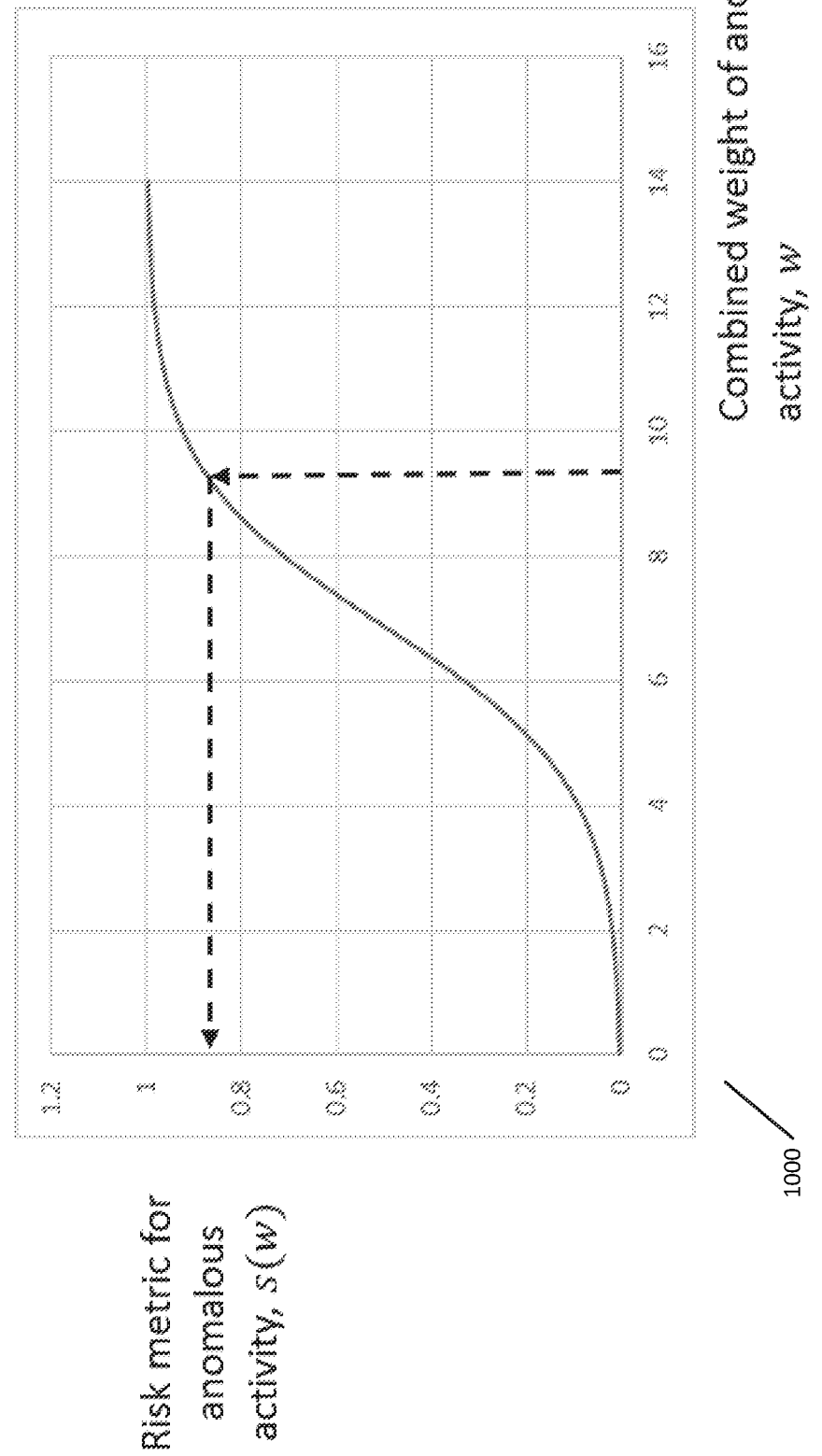
FIG. 10 illustrates a graph showing the risk metric/event score s(w) as a function of the combined weight of an anomalous activity/event according to an exemplary embodiment.

FIG. 10 illustrates a graph 1000 illustrating the risk metric/event score s(w) as a function of the combined weight of an anomalous activity/event. As shown in the graph 1000, the risk metric increases as the combined weight of the anomalous activity increases.

As will be discussed further below, the risk metric can be used to determine whether to perform one or more security actions corresponding to the user or the detected anomalous activity. For example, if the risk metric is above a predefined threshold, then a restriction can be placed on the user account or a security administrator can be notified.

The present system transforms anomalous activity data collected by monitoring agents on one or more data stores of a computer network into risk metric data that triggers automatic security actions pertaining to users having anomalous activity data that is determined to exceed a certain risk threshold. This transformation changes both the nature and the function of data exchanged within the computer network. Whereas user activity data pertains to actions performed by a user within the computer network and relates, for example, to access of certain content data stores, records, or types within the computer network, the risk metric data quantifies acute risk posed by a user to network security based upon analysis and transformation of different facets of the anomalous activity data.

Additionally, the present system relies upon monitoring of data stores within a computer network in order to effectively identify anomalous activity. In particular, each user's network behavior, such as which data stores they usually access and how frequently, which data types they usually access and how frequently, which sensitive data types they usually access and how frequently, and/or their usual access location and times, is required to be tracked in order to identify network behavior that is anomalous. Therefore, the system necessarily requires monitoring, collection, and analysis of user network activity and behaviors across data stores of a computer network. Without tracking of network activities of users across multiple periods of time and without tracking which specific content elements within the network (such as which data stores, records, or data types) a user typically interacts with, it would be impossible to identify, process, or transform anomalous activity data for a particular user.

In addition to a risk metric corresponding to anomalous activity of a user, the system disclosed herein can be used to determine an attention metric corresponding to a user. The attention metric provides an actionable insight which enables system administrator to prioritize which actors/users should be scrutinized. The attention metric is a metric which estimates potential risk posed by the actor/user and can be used to determine whether a particular actor/user requires more attention from a security administrator. The system disclosed herein operates to improve the technology field of network security as the disclosed risk metric and attention metric greatly reduce the burden on security analysts in identifying high risk patterns of data access and behavior in a computer network and activating appropriate security responses. Additionally, the system disclosed herein improves the performance of computing devices dedicated to monitoring behavior of users on a network. In particular, by filtering and flagging highest risk users and anomalous activities, computing resources can be freed from in-depth monitoring and analysis of other users or activities to focus on the highest risk users, activities, and trends.

Figure 11:
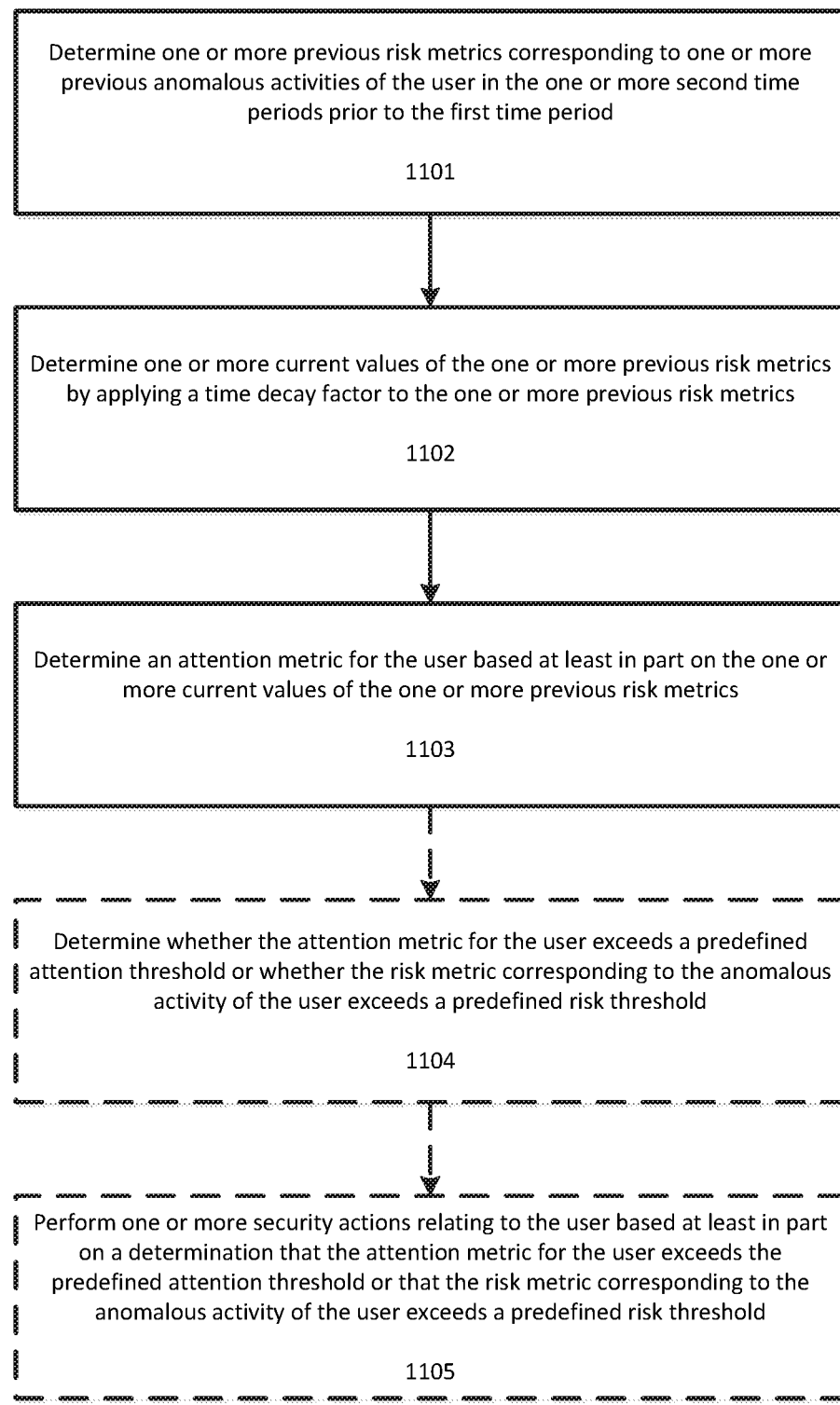
FIG. 11 illustrates a flowchart for determining an attention metric and performing security actions according to an exemplary embodiment.

FIG. 11 illustrates a flowchart for determining an attention metric and performing security actions according to an exemplary embodiment.

At step 1101 one or more previous risk metrics corresponding to one or more previous anomalous activities of the user are determined. The previous risk metrics can correspond to one or more second time periods prior to a first time period that is used as the basis to compute a current risk metric.

At step 1102 one or more current values of the one or more previous risk metrics are determined by applying a time decay factor to the one or more previous risk metrics. The time decay factor is based at least in part on an elapsed time between one or more times associated with the one or more previous anomalous activities of the user and a time associated with the latest anomalous activity of the user or latest time period that has been monitored.

At step 1103 an attention metric is determined for the user based at least in part on the one or more current values of the one or more previous risk metrics.

The attention metric is a weighted sum of individual events (anomalous events and violations) associated with the actor during a finite period. The attention metric is an integral measure over time but the input of historical events exponentially diminishes with the passage of time since the event.

The attention metric at the time of latest event/activity T can be computed as a value of an activation function, such as the following sigmoid function:

$$A(T) = \frac{1}{1 + e^{-(aW(T)+b)}},$$

where A(T) is the attention metric for the user, $W(T) = \sum_{i=1}^{M} s(t_i) w_i$, M corresponds to the total instances of anomalous activity/events, $s(t_i)$ corresponds to a score of an event at time $t_i < T$, $w_i$ corresponds to a time decay factor based upon time and is given by the equation:

$$w(t)e^{-\alpha t}$$

where α is a coefficient selected in such way that the weight of event becomes negligible at the end of the statutory period. For example, α can be selected such that after 30 days the time decay factor of an event is equal to 0.01.

Figure 12:
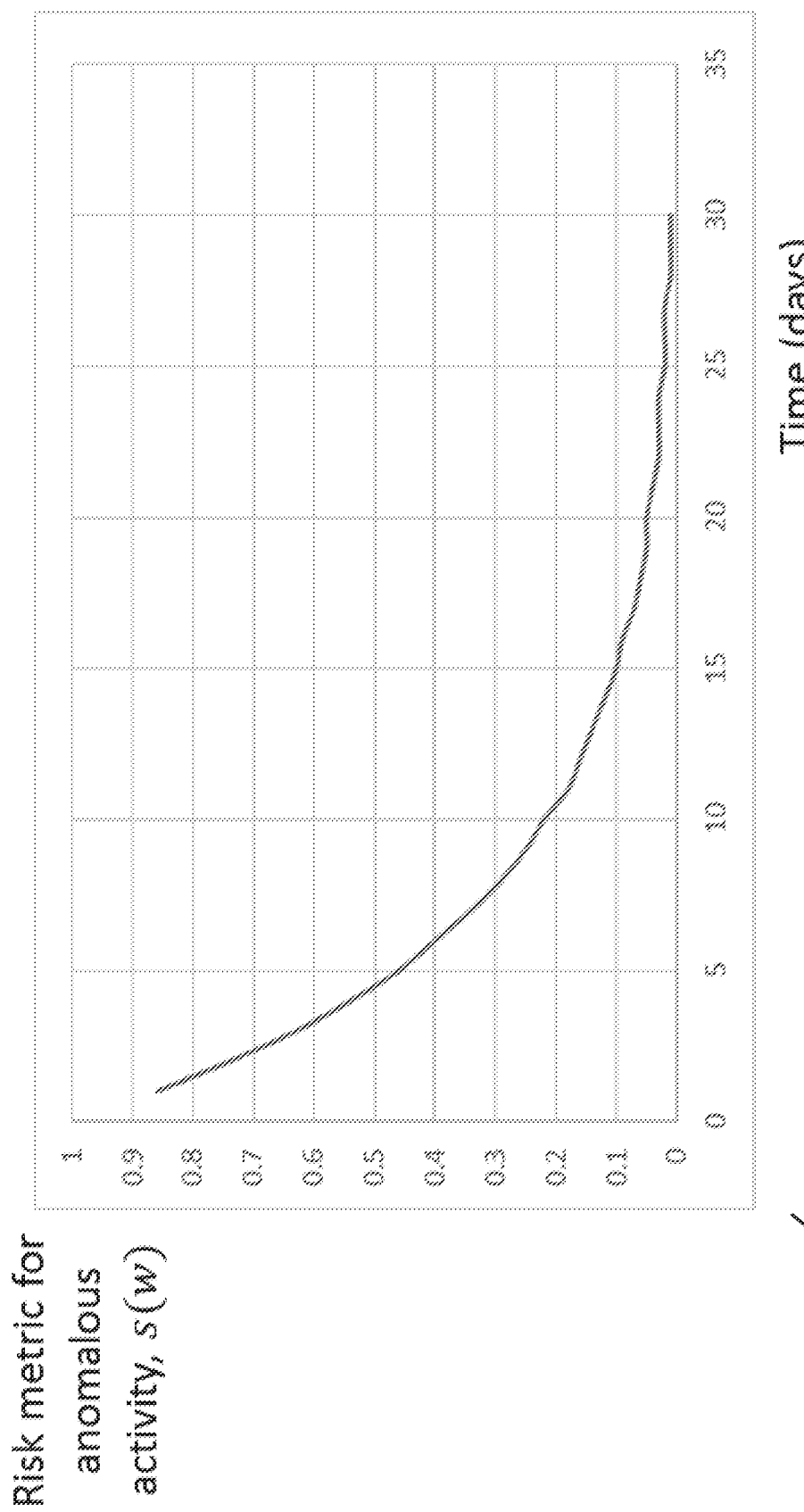
FIG. 12 illustrates a graph showing reduction of the time decay factor w of an event or anomalous activity over a statutory period of 30 days set forth by a system administrator.

FIG. 12 illustrates a graph 1200 showing reduction of the time decay factor w of an event or anomalous activity over a statutory period of 30 days set forth by a system administrator. The event time decay factor w is reduced exponentially with the passage of time t: $w(t)=e^{-\alpha t}$, where α is a coefficient selected in such way that the time decay factor of the event becomes negligible at the end of the statutory period. As shown in graph 1200, the time decay factor is nearly negligible at the 30 day mark.

Returning to FIG. 11, at step 1104 it is determined whether the attention metric for the user exceeds a predefined attention threshold or whether the risk metric corresponding to the anomalous activity of the user exceeds a predefined risk threshold. At step 1105 one or more security actions relating to the user are performed based at least in part on a determination that the attention metric for the user exceeds the predefined attention threshold or that the risk metric corresponding to the anomalous activity of the user exceeds a predefined risk threshold. As discussed earlier, these security actions can include restricting user access to certain records, types, or data stores, restricting overall user access, reporting the risk metric, the attention metric, or anomalous data to the administrator, sending automated alerts, or performing any other security action to mitigate or resolve a potential threat. The risk metric and attention metric can also be used by the system to prioritize, rank, order and/or implement security measures. For example, security actions can be applied to a ranked list of user or incidents depending relative risk metrics and attention metrics. Either the risk metric and attention metric can be used as a measure used to rank users for security actions and/or to provide actionable intelligence to security administrators.

Abnormal activities in an enterprise environment attributed to an actor (such as a user or process) can be classified as an anomaly or as a violation. Anomalies are a class of unusual or unexpected actor's activities which do not break any enterprise policies and which are discussed at length in the preceding sections.

Abnormal activities can also include "violations," which are a class of actor's activities that are non-conformant to the policies set forth in the enterprise. Both violations and anomalies have the potential indicating undesired consequences, resulting in an implicit risk to the system.

A violation can be thought of as an independent binary event which potentially may trigger additional binary events while an anomaly manifests fuzzy characteristics dependent on the current state of the observed universe of discourse. For example, an actor's access to an asset to which this actor does not have access rights triggers a violation. Conversely, an anomaly may be reported when an actor accesses a data asset on weekend but, if after some time work during a weekend becomes that actor's habit, anomalous events to that matter are no longer reported.

Violations and anomalies associated with actor's activities may often induce a situation involving exposure of the enterprise assets to danger. The implicit risk quantification techniques and systems proposed herein enables robust comparison of a plurality of events associated with a plurality of enterprise actors.

Figure 13:
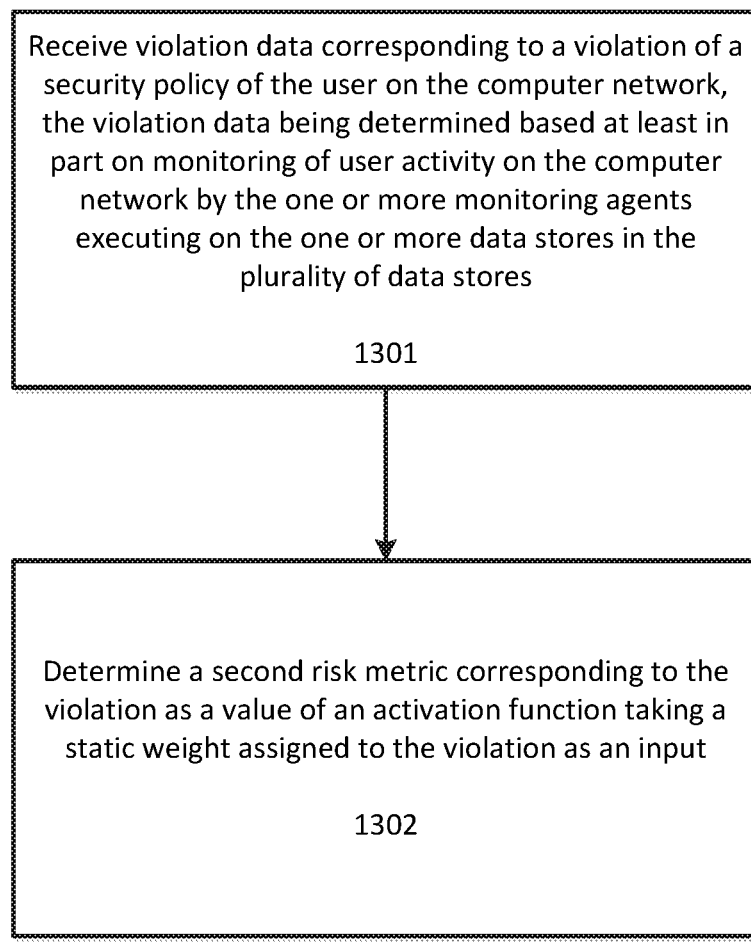
FIG. 13 illustrates a flowchart for generating a risk metric corresponding to a violation according to an exemplary embodiment.

FIG. 13 illustrates a flowchart for determining a risk metric corresponding to a violation according to an exemplary embodiment. At step 1301 violation data corresponding to a violation of a security policy of the user on the computer network is received. Similar to the anomalous activity information, the violation data is determined based at least in part on monitoring of user activity on the computer network by one or more monitoring agents executing on the one or more data stores in the plurality of data stores of the computer network.

Violations are reported when an action attached to a corresponding policy is triggered. A violation can be represented by a binary data type: it is either reported (1) or not (0). There is no limit on the number of policies which report violations.

Violation severity can be classified by a static weight between 1 and 10. Policy violation severity weights can be assigned to each active policy by the system administrator or determined automatically or by some process. Violations and anomalous events can be reported asynchronously by different components. It is appreciated that violations and anomalous events can also be reported simultaneously by a single component.

At step 1302 a second risk metric corresponding to the violation is determined as a value of an activation function, such as a sigmoid function, taking a static weight assigned to the violation as an input. In this case, the equation for risk metric, s(w), can be used and the combined weight of the violation can be set equal to the assigned static weight. In the situation where no anomalous behavior is reported and only violations are reported, the risk metric determined will be the first risk metric, since no risk metric corresponding to anomalous activity would be determined.

Additionally, any of the techniques described with respect to anomalous activity can be utilized with respect to reported violations. For example, the attention metric can be also be determined based upon risk metrics determined for violations in addition to risk metrics determined for anomalous activities.

The disclosed system and method describes a novel approach to estimating a measure of implicit risk due to activities observed in the enterprise environment by monitoring agents. The techniques and systems disclosed herein enables robust derivation of a metric associated with a first event suitable for comparison with a second event without regard to said events' structural composition. Additionally, the attention metric provides a measure of implicit risk associated with an enterprise actor.

Violations and anomalies associated with actor's activities may often induce a situation involving exposure of the enterprise assets to danger. The implicit risk quantification methodology proposed herein enables robust comparison of a plurality of events associated with a plurality of enterprise actors.

Figure 14:
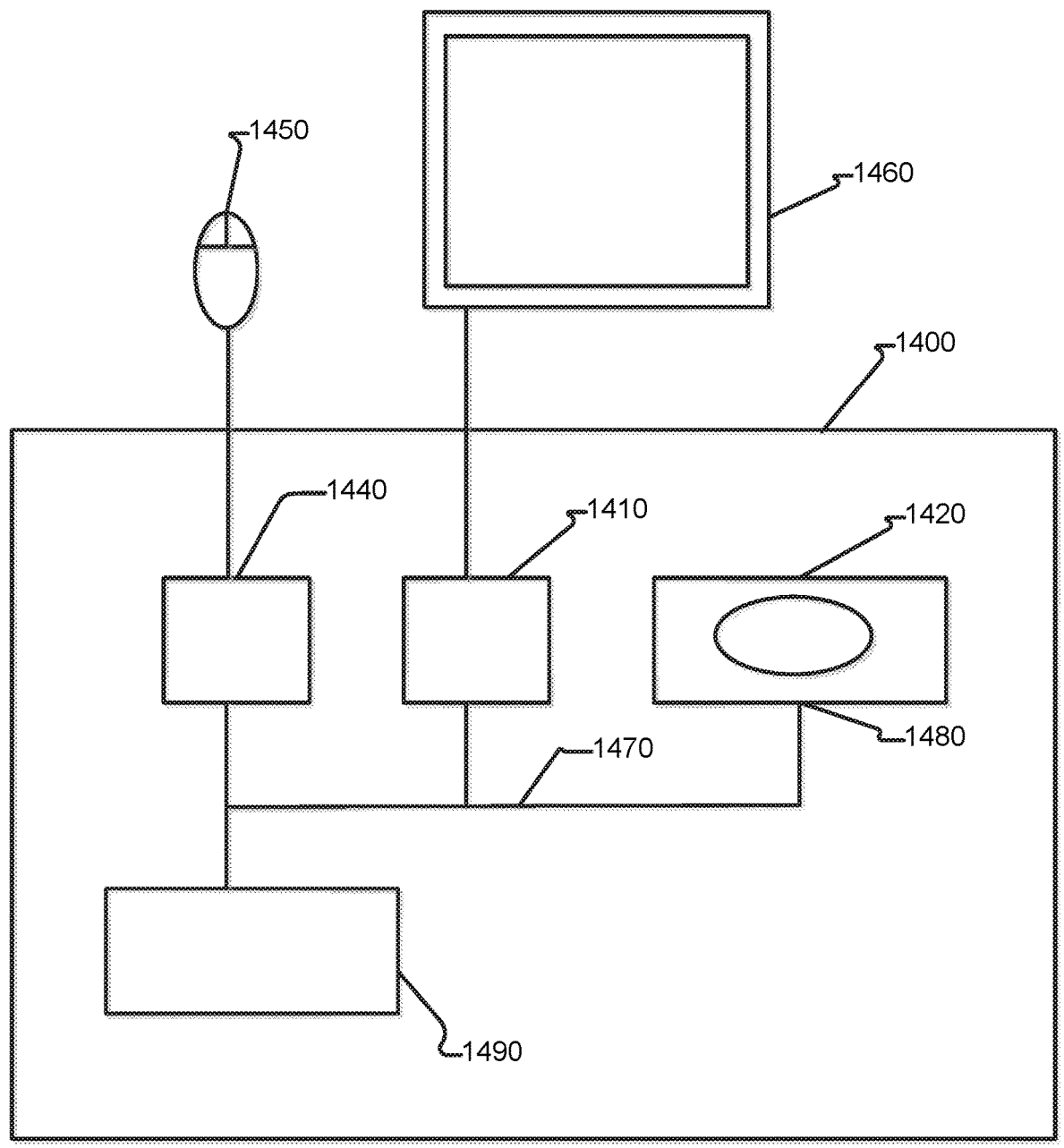
FIG. 14 illustrates an exemplary computing environment that can be used to carry out the method for determining risk associated with anomalous behavior.

One or more of the above-described techniques can be implemented in or involve one or more computer systems. FIG. 14 illustrates an example of a computing environment 1400. The computing environment 1400 is not intended to suggest any limitation as to scope of use or functionality of a described embodiment(s).

With reference to FIG. 14, the computing environment 1400 includes at least one processing unit 1410 and memory 1420. The processing unit 1410 executes computer-executable instructions and can be a real or a virtual processor. In a multi-processing system, multiple processing units execute computer-executable instructions to increase processing power. The memory 1420 can be volatile memory (e.g., registers, cache, RAM), non-volatile memory (e.g., ROM, EEPROM, flash memory, etc.), or some combination of the two. The memory 1420 can store software 1480 implementing described techniques.

A computing environment can have additional features. For example, the computing environment 1400 includes storage 1440, one or more input devices 1450, one or more output devices 1460, and one or more communication connections 1490. An interconnection mechanism 1470, such as a bus, controller, or network interconnects the components of the computing environment 1400. Typically, operating system software or firmware (not shown) provides an operating environment for other software executing in the computing environment 1400, and coordinates activities of the components of the computing environment 1400.

The storage 1440 can be removable or non-removable, and includes magnetic disks, magnetic tapes or cassettes, CD-ROMs, CD-RWs, DVDs, or any other medium which can be used to store information and which can be accessed within the computing environment 1400. The storage 1440 can store instructions for the software 1480.

The input device(s) 1450 can be a touch input device such as a keyboard, mouse, pen, trackball, touch screen, or game controller, a voice input device, a scanning device, a digital camera, remote control, or another device that provides input to the computing environment 1400. The output device(s) 1460 can be a display, television, monitor, printer, speaker, or another device that provides output from the computing environment 1400.

The communication connection(s) 1490 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the context of computer-readable media. Computer-readable media are any available media that can be accessed within a computing environment. By way of example, and not limitation, within the computing environment 1400, computer-readable media include memory 1420, storage 1440, communication media, and combinations of any of the above.

Of course, FIG. 14 illustrates computing environment 1400, display device 1460, and input device 1450 as separate devices for ease of identification only. Computing environment 1400, display device 1460, and input device 1450 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1400 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

I claim:

1. A method executed by one or more computing devices for determining risk associated with anomalous behavior of a user on a computer network, the method comprising:

receiving anomalous behavioral data corresponding to an anomalous activity of the user on the computer network, the computer network comprising a plurality of data stores, wherein the anomalous behavioral data comprises one or more behavioral factors having one or more current values determined based at least in part on monitoring of user activity on the computer network over a first time period by one or more monitoring agents executing on one or more data stores in the plurality of data stores;

determining one or more surprisal values corresponding to the one or more behavioral factors based on one or more of: one or more probabilities corresponding to the one or more current values or one or more characteristics of the one or more behavioral factors;

determining one or more dynamic weights corresponding to the one or more behavioral factors based at least in part on the one or more current values and one or more historically expected values of the one or more behavioral factors for the user, wherein the one or more historically expected values are determined based at least in part on monitoring of user activity on the computer network over one or more second time periods prior to the first time period by the one or more monitoring agents executing on the one or more data stores; and generating a risk metric corresponding to the anomalous activity of the user based at least in part on the one or more surprisal values, the one or more dynamic weights, and one or more static weights assigned to the one or more behavioral factors.

2. The method of claim 1, wherein the one or more behavioral factors comprise one or more of:
   access time of day;
   access day of week;
   relocation of the user;
   count of data stores accessed;
   count of data requests;
   count of sensitive data requests;
   count of records accessed;
   count of sensitive records accessed;
   count of data types accessed;
   count of sensitive data types accessed; or cross group access.

3. The method of claim 1, wherein determining one or more surprisal values corresponding to the one or more behavioral factors comprises, for each behavioral factor in the one or more behavioral factors:
   determining whether the behavioral factor is content agnostic; and
   setting the surprisal value corresponding to the behavioral factor to be equal to one based at least in part on a determination that the behavioral factor is content agnostic; and
   determining the surprisal value corresponding to the behavioral factor as a function of at least one probability corresponding to a current value of the behavioral factor based at least in part on a determination that the behavior factor is not content agnostic.

4. The method of claim 3, wherein the current value of the behavioral factor indicates at least one unique content element and wherein determining the surprisal value corresponding to the behavioral factor based on at least one probability corresponding to a current value of the behavioral factor based at least in part on a determination that the behavior factor is not content agnostic comprises:
   determining at least one user count corresponding to the least one unique content element, wherein the at least one user count indicates at least one first quantity associated with behavior of the user relative to the at least one unique content element over the first time period;
   determining at least one total count corresponding to the least one unique content element, wherein the at least one total count indicates at least one second quantity associated with behavior of a plurality of users relative to the at least one unique content element over the first time period;
   determining the at least one probability corresponding to the current value by dividing the at least one total count by the at least one user count; and
   determining the surprisal value corresponding to the behavioral factor based at least in part on a summation of at least one self-information value corresponding to the at least one probability.

5. The method of claim 1, wherein determining one or more dynamic weights corresponding to the one or more behavioral factors based at least in part on the one or more current values and one or more historically expected values of the one or more behavioral factors for the user comprises, for each behavioral factor:
   computing a historically expected value of the behavioral factor as an average value of the behavioral factor over the one or more second time periods;
   computing a perceived utility value of a ratio of a current value of the behavioral factor to the historically expected value of the behavioral factor; and
   designating the computed perceived utility value as a dynamic weight corresponding to the behavioral factor.

6. The method of claim 1, wherein generating a risk metric corresponding to the anomalous activity of the user based at least in part on the one or more surprisal values, the one or more dynamic weights, and one or more static weights assigned to the one or more behavioral factors comprises:
   determining one or more final weights corresponding to the one or more behavioral factors based at least in part on the one or more dynamic weights and the one or more static weights;
   determining a combined weight for the one or more behavioral factors based at least in part on the one or more final weights and the one or more surprisal values; and
   determining the risk metric as a value of an activation function taking the combined weight as an input.

7. The method of claim 1, further comprising:
   determining one or more previous risk metrics corresponding to one or more previous anomalous activities of the user;
   determining one or more current values of the one or more previous risk metrics by applying a time decay factor to the one or more previous risk metrics, wherein the time decay factor is based at least in part on an elapsed time between one or more times associated with the one or more previous anomalous activities of the user and a time associated with the anomalous activity of the user; and
   determining an attention metric for the user based at least in part on the one or more current values of the one or more previous risk metrics.

8. The method of claim 7, further comprising:
   determining whether the attention metric for the user exceeds a predefined attention threshold or whether the risk metric corresponding to the anomalous activity of the user exceeds a predefined risk threshold; and
   performing one or more security actions relating to the user based at least in part on a determination that the attention metric for the user exceeds the predefined attention threshold or that the risk metric corresponding to the anomalous activity of the user exceeds a predefined risk threshold.

9. The method of claim 1, further comprising:
   receiving violation data corresponding to a violation of a security policy of the user on the computer network, wherein the violation data is determined based at least in part on monitoring of user activity on the computer network by the one or more monitoring agents executing on the one or more data stores in the plurality of data stores; and determining a second risk metric corresponding to the violation as a value of an activation function taking a static weight assigned to the violation as an input.

10. An apparatus for determining risk associated with anomalous behavior of a user on a computer network, the apparatus comprising:

one or more processors; and one or more memories operatively coupled to at least one of the one or more processors and having instructions stored thereon that, when executed by at least one of the one or more processors, cause at least one of the one or more processors to:

receive anomalous behavioral data corresponding to an anomalous activity of the user on the computer network, the computer network comprising a plurality of data stores, wherein the anomalous behavioral data comprises one or more behavioral factors having one or more current values determined based at least in part on monitoring of user activity on the computer network over a first time period by one or more monitoring agents executing on one or more data stores in the plurality of data stores;

determine one or more surprisal values corresponding to the one or more behavioral factors based on one or more of: one or more probabilities corresponding to the one or more current values or one or more characteristics of the one or more behavioral factors;

determine one or more dynamic weights corresponding to the one or more behavioral factors based at least in part on the one or more current values and one or more historically expected values of the one or more behavioral factors for the user, wherein the one or more historically expected values are determined based at least in part on monitoring of user activity on the computer network over one or more second time periods prior to the first time period by the one or more monitoring agents executing on the one or more data stores; and generate a risk metric corresponding to the anomalous activity of the user based at least in part on the one or more surprisal values, the one or more dynamic weights, and one or more static weights assigned to the one or more behavioral factors.

11. The apparatus of claim 10, wherein the one or more behavioral factors comprise one or more of:

access time of day;
access day of week;
relocation of the user;
count of data stores accessed;
count of data requests;
count of sensitive data requests;
count of records accessed;
count of sensitive records accessed;
count of data types accessed;
count of sensitive data types accessed; or cross group access.

12. The apparatus of claim 10, wherein the instructions that, when executed by at least one of the one or more processors, cause at least one of the one or more processors to determine one or more surprisal values corresponding to the one or more behavioral factors further cause at least one of the one or more processors to, for each behavioral factor in the one or more behavioral factors:

determine whether the behavioral factor is content agnostic; and set the surprisal value corresponding to the behavioral factor to be equal to one based at least in part on a determination that the behavioral factor is content agnostic; and determine the surprisal value corresponding to the behavioral factor as a function of at least one probability corresponding to a current value of the behavioral factor based at least in part on a determination that the behavior factor is not content agnostic.

13. The apparatus of claim 12, wherein the current value of the behavioral factor indicates at least one unique content element and wherein the instructions that, when executed by at least one of the one or more processors, cause at least one of the one or more processors to determine the surprisal value corresponding to the behavioral factor based on at least one probability corresponding to a current value of the behavioral factor based at least in part on a determination that the behavior factor is not content agnostic further cause at least one of the one or more processors to:

determine at least one user count corresponding to the least one unique content element, wherein the at least one user count indicates at least one first quantity associated with behavior of the user relative to the at least one unique content element over the first time period;

determining at least one total count corresponding to the least one unique content element, wherein the at least one total count indicates at least one second quantity associated with behavior of a plurality of users relative to the at least one unique content element over the first time period;

determine the at least one probability corresponding to the current value by dividing the at least one total count by the at least one user count; and determine the surprisal value corresponding to the behavioral factor based at least in part on a summation of at least one self-information value corresponding to the at least one probability.

14. The apparatus of claim 10, wherein the instructions that, when executed by at least one of the one or more processors, cause at least one of the one or more processors to determine one or more dynamic weights corresponding to the one or more behavioral factors based at least in part on the one or more current values and one or more historically expected values of the one or more behavioral factors for the user further cause at least one of the one or more processors to, for each behavioral factor:

compute a historically expected value of the behavioral factor as an average value of the behavioral factor over the one or more second time periods;

compute a perceived utility value of a ratio of a current value of the behavioral factor to the historically expected value of the behavioral factor; and designate the computed perceived utility value as a dynamic weight corresponding to the behavioral factor.

15. The apparatus of claim 10, wherein the instructions that, when executed by at least one of the one or more processors, cause at least one of the one or more processors to generate a risk metric corresponding to the anomalous activity of the user based at least in part on the one or more surprisal values, the one or more dynamic weights, and one or more static weights assigned to the one or more behavioral factors further cause at least one of the one or more processors to:

determine one or more final weights corresponding to the one or more behavioral factors based at least in part on the one or more dynamic weights and the one or more static weights;

determine a combined weight for the one or more behavioral factors based at least in part on the one or more final weights and the one or more surprisal values; and determine the risk metric as a value of an activation function taking the combined weight as an input.

16. The apparatus of claim 10, wherein at least one of the one or more memories has further instructions stored thereon that, when executed by at least one of the one or more processors, cause at least one of the one or more processors to:

determine one or more previous risk metrics corresponding to one or more previous anomalous activities of the user;

determine one or more current values of the one or more previous risk metrics by applying a time decay factor to the one or more previous risk metrics, wherein the time decay factor is based at least in part on an elapsed time between one or more times associated with the one or more previous anomalous activities of the user and a time associated with the anomalous activity of the user; and determine an attention metric for the user based at least in part on the one or more current values of the one or more previous risk metrics.

17. The apparatus of claim 16, wherein at least one of the one or more memories has further instructions stored thereon that, when executed by at least one of the one or more processors, cause at least one of the one or more processors to:

determine whether the attention metric for the user exceeds a predefined attention threshold or whether the risk metric corresponding to the anomalous activity of the user exceeds a predefined risk threshold; and perform one or more security actions relating to the user based at least in part on a determination that the attention metric for the user exceeds the predefined attention threshold or that the risk metric corresponding to the anomalous activity of the user exceeds a predefined risk threshold.

18. The apparatus of claim 10, wherein at least one of the one or more memories has further instructions stored thereon that, when executed by at least one of the one or more processors, cause at least one of the one or more processors to:

receive violation data corresponding to a violation of a security policy of the user on the computer network, wherein the violation data is determined based at least in part on monitoring of user activity on the computer network by the one or more monitoring agents executing on the one or more data stores in the plurality of data stores; and determine a second risk metric corresponding to the violation as a value of an activation function taking a static weight assigned to the violation as an input.

19. At least one non-transitory computer-readable medium storing computer-readable instructions that, when executed by one or more computing devices, cause at least one of the one or more computing devices to:

receive anomalous behavioral data corresponding to an anomalous activity of a user on a computer network, the computer network comprising a plurality of data stores, wherein the anomalous behavioral data comprises one or more behavioral factors having one or more current values determined based at least in part on monitoring of user activity on the computer network over a first time period by one or more monitoring agents executing on one or more data stores in the plurality of data stores;

determine one or more surprisal values corresponding to the one or more behavioral factors based on one or more of: one or more probabilities corresponding to the one or more current values or one or more characteristics of the one or more behavioral factors;

determine one or more dynamic weights corresponding to the one or more behavioral factors based at least in part on the one or more current values and one or more historically expected values of the one or more behavioral factors for the user, wherein the one or more historically expected values are determined based at least in part on monitoring of user activity on the computer network over one or more second time periods prior to the first time period by the one or more monitoring agents executing on the one or more data stores; and generate a risk metric corresponding to the anomalous activity of the user based at least in part on the one or more surprisal values, the one or more dynamic weights, and one or more static weights assigned to the one or more behavioral factors.

20. The at least one non-transitory computer-readable medium of claim 19, wherein the one or more behavioral factors comprise one or more of:

access time of day;
access day of week;
relocation of the user;
count of data stores accessed;
count of data requests;
count of sensitive data requests;
count of records accessed;
count of sensitive records accessed;
count of data types accessed;
count of sensitive data types accessed; or cross group access.

21. The at least one non-transitory computer-readable medium of claim 19, wherein the instructions that, when executed by at least one of the one or more computing devices, cause at least one of the one or more computing devices to determine one or more surprisal values corresponding to the one or more behavioral factors further cause at least one of the one or more computing devices to, for each behavioral factor in the one or more behavioral factors:

determine whether the behavioral factor is content agnostic; and set the surprisal value corresponding to the behavioral factor to be equal to one based at least in part on a determination that the behavioral factor is content agnostic; and determine the surprisal value corresponding to the behavioral factor as a function of at least one probability corresponding to a current value of the behavioral factor based at least in part on a determination that the behavior factor is not content agnostic.

22. The at least one non-transitory computer-readable medium of claim 21, wherein the current value of the behavioral factor indicates at least one unique content element and wherein the instructions that, when executed by at least one of the one or more computing devices, cause at least one of the one or more computing devices to determine the surprisal value corresponding to the behavioral factor based on at least one probability corresponding to a current value of the behavioral factor based at least in part on a determination that the behavior factor is not content agnostic further cause at least one of the one or more computing devices to:
- determine at least one user count corresponding to the least one unique content element, wherein the at least one user count indicates at least one first quantity associated with behavior of the user relative to the at least one unique content element over the first time period;
- determining at least one total count corresponding to the least one unique content element, wherein the at least one total count indicates at least one second quantity associated with behavior of a plurality of users relative to the at least one unique content element over the first time period;
- determine the at least one probability corresponding to the current value by dividing the at least one total count by the at least one user count; and
- determine the surprisal value corresponding to the behavioral factor based at least in part on a summation of at least one self-information value corresponding to the at least one probability.

23. The at least one non-transitory computer-readable medium of claim 19, wherein the instructions that, when executed by at least one of the one or more computing devices, cause at least one of the one or more computing devices to determine one or more dynamic weights corresponding to the one or more behavioral factors based at least in part on the one or more current values and one or more historically expected values of the one or more behavioral factors for the user further cause at least one of the one or more computing devices to, for each behavioral factor:
- compute a historically expected value of the behavioral factor as an average value of the behavioral factor over the one or more second time periods;
- compute a perceived utility value of a ratio of a current value of the behavioral factor to the historically expected value of the behavioral factor; and
- designate the computed perceived utility value as a dynamic weight corresponding to the behavioral factor.

24. The at least one non-transitory computer-readable medium of claim 19, wherein the instructions that, when executed by at least one of the one or more computing devices, cause at least one of the one or more computing devices to generate a risk metric corresponding to the anomalous activity of the user based at least in part on the one or more surprisal values, the one or more dynamic weights, and one or more static weights assigned to the one or more behavioral factors further cause at least one of the one or more computing devices to:
- determine one or more final weights corresponding to the one or more behavioral factors based at least in part on the one or more dynamic weights and the one or more static weights;
- determine a combined weight for the one or more behavioral factors based at least in part on the one or more final weights and the one or more surprisal values; and
- determine the risk metric as a value of an activation function taking the combined weight as an input.

25. The at least one non-transitory computer-readable medium of claim 19, further storing computer-readable instructions that, when executed by at least one of the one or more computing devices, cause at least one of the one or more computing devices to:
- determine one or more previous risk metrics corresponding to one or more previous anomalous activities of the user;
- determine one or more current values of the one or more previous risk metrics by applying a time decay factor to the one or more previous risk metrics, wherein the time decay factor is based at least in part on an elapsed time between one or more times associated with the one or more previous anomalous activities of the user and a time associated with the anomalous activity of the user; and
- determine an attention metric for the user based at least in part on the one or more current values of the one or more previous risk metrics.

26. The at least one non-transitory computer-readable medium of claim 25, further storing computer-readable instructions that, when executed by at least one of the one or more computing devices, cause at least one of the one or more computing devices to:
- determine whether the attention metric for the user exceeds a predefined attention threshold or whether the risk metric corresponding to the anomalous activity of the user exceeds a predefined risk threshold; and
- perform one or more security actions relating to the user based at least in part on a determination that the attention metric for the user exceeds the predefined attention threshold or that the risk metric corresponding to the anomalous activity of the user exceeds a predefined risk threshold.

27. The at least one non-transitory computer-readable medium of claim 19, further storing computer-readable instructions that, when executed by at least one of the one or more computing devices, cause at least one of the one or more computing devices to:
- receive violation data corresponding to a violation of a security policy of the user on the computer network, wherein the violation data is determined based at least in part on monitoring of user activity on the computer network by the one or more monitoring agents executing on the one or more data stores in the plurality of data stores; and
- determine a second risk metric corresponding to the violation as a value of an activation function taking a static weight assigned to the violation as an input.

* * * * *